United States Patent
Lee et al.

(10) Patent No.: US 9,628,628 B2
(45) Date of Patent: Apr. 18, 2017

(54) VOICEMAIL SYSTEM

(71) Applicant: BRITISH TELECOMMUNICATIONS public limited company, London (GB)

(72) Inventors: Raymond Ley Lee, London (GB); Stuart Laurence King, London (GB); Tim Potranandana, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/410,998

(22) PCT Filed: Jun. 25, 2013

(86) PCT No.: PCT/GB2013/000283
§ 371 (c)(1),
(2) Date: Dec. 23, 2014

(87) PCT Pub. No.: WO2014/001746
PCT Pub. Date: Jan. 3, 2014

(65) Prior Publication Data
US 2015/0326726 A1 Nov. 12, 2015

(30) Foreign Application Priority Data

Jun. 29, 2012 (EP) .................................. 12250129

(51) Int. Cl.
*H04M 3/537* (2006.01)
*H04M 3/533* (2006.01)
(Continued)

(52) U.S. Cl.
CPC ........... *H04M 3/537* (2013.01); *H04M 3/533* (2013.01); *H04M 3/53333* (2013.01);
(Continued)

(58) Field of Classification Search
CPC .............................. H04W 12/06; H04M 3/533
(Continued)

(56) References Cited

U.S. PATENT DOCUMENTS 8,577,341 B2 * 11/2013 Jacobstein ........ H04M 3/53383
455/413
2008/0247520 A1 * 10/2008 Scott ................. H04M 3/53316
379/88.17
(Continued)

FOREIGN PATENT DOCUMENTS

EP 2 317 705 5/2011

OTHER PUBLICATIONS

International Search Report for PCT/GB2013/000283, mailed Sep. 23, 2013.
(Continued)

*Primary Examiner* — Michael T Vu
(74) *Attorney, Agent, or Firm* — Nixon & Vanderhye P.C.

(57) ABSTRACT

A system comprises a first and second interface and a voicemail server. The first interface-communicating via a communications network with a first communication device operated by a calling party. The voicemail server configured to receive via the first interface from the first communication device a call directed to a called party and redirected to connect the calling party to the voicemail server. The voicemail server providing to the calling party a notification of a network location. The second interface is associated with the network location and communicates via a communications network with a second communication device operated by the calling party. The second interface receives via the communications network from the second communication device a request for access to the network location and provides to the calling party via the network location, access to a registration process for registering the calling (Continued)

party to receive a voicemail service from the voicemail system.

16 Claims, 10 Drawing Sheets

(51) Int. Cl.
 *H04W 12/06* (2009.01)
 *H04W 4/12* (2009.01)
 *H04W 4/16* (2009.01)

(52) U.S. Cl.
 CPC .............. *H04W 4/12* (2013.01); *H04W 12/06* (2013.01); *H04W 4/16* (2013.01)

(58) Field of Classification Search
 USPC .......................................... 455/411–414, 456
 See application file for complete search history.

(56) References Cited

U.S. PATENT DOCUMENTS

2011/0136474 A1    6/2011  Ren et al.

2011/0143721 A1*   6/2011  Raphael ................ H04L 12/587
                                                  455/413

OTHER PUBLICATIONS

"vInbox", Dec. 10, 2011, pp. 1-7, XP055043387, CNET, Retrieved from the Internet: URL: http://download.cnet.com/vInbox/3000-10440_4-75624713.html [retrieved on Nov. 7, 2012] (7 pgs.).
Springlab: "VInbox Visual Voicemail", Apr. 7, 2012, XP055043258, Retrieved from the Internet: URL: http://www.appbrain.com/app/vinbox-visual-voicemail/com.bt.vinbox [retrieved Nov. 6, 2011] (4 pgs.).
vInbox 2.2, Mar. 21, 2012, pp. 1-6, XP055043390, Retrieved from the Internet: URL: http://appfinder.lisisoft.com/app/vinbox/html [retrieved Nov. 7, 2012] (6 pgs.).
AT&T Voicemail Viewer User Guide, Copyright 2011 (72 pgs.).
Office Action dated Dec. 9, 2016 issued in corresponding European Application No. 13 733 405.8-1972 (5 pgs.).

* cited by examiner

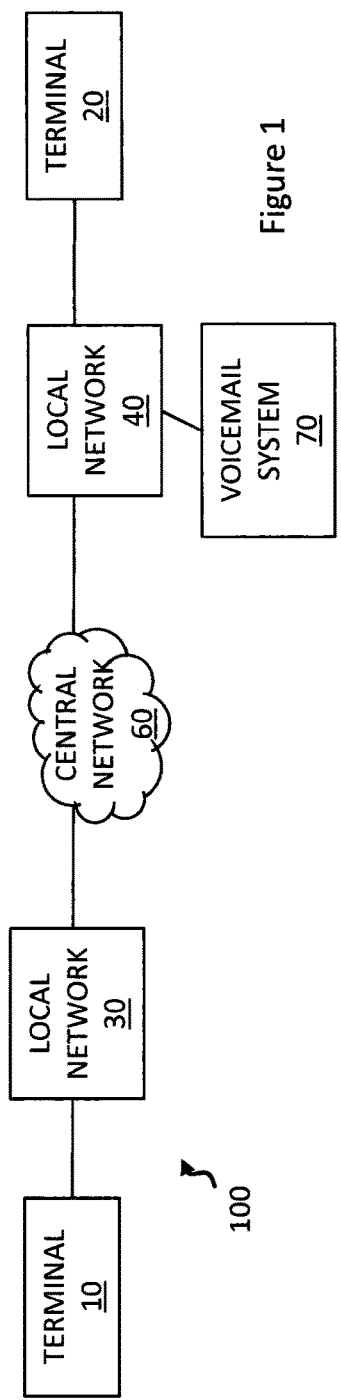
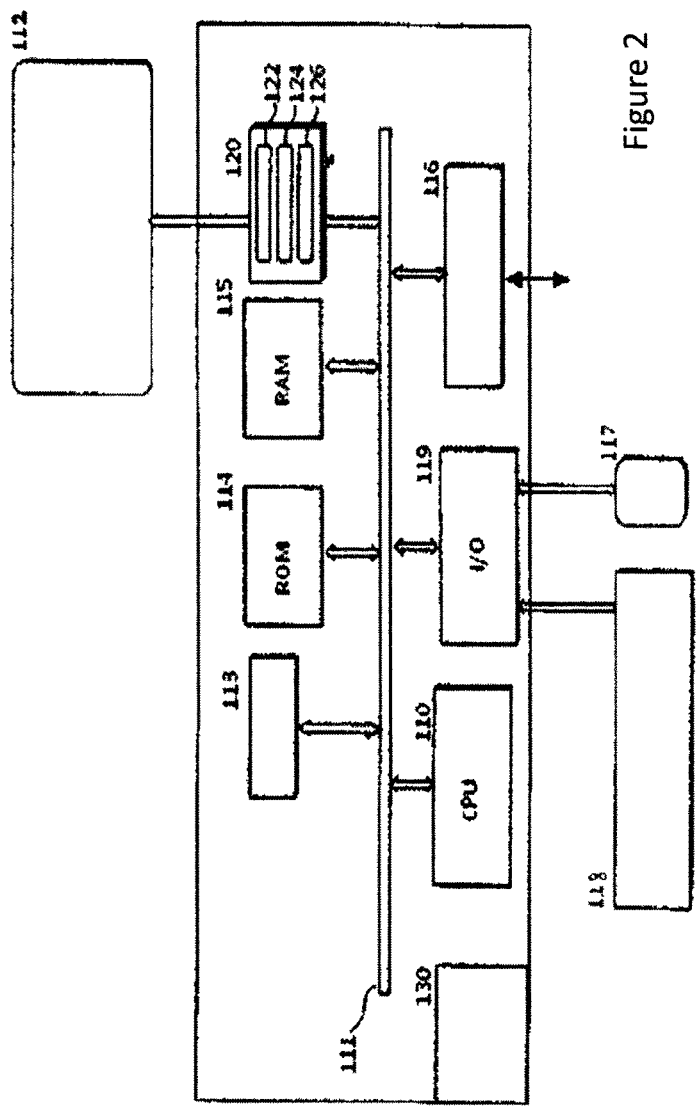

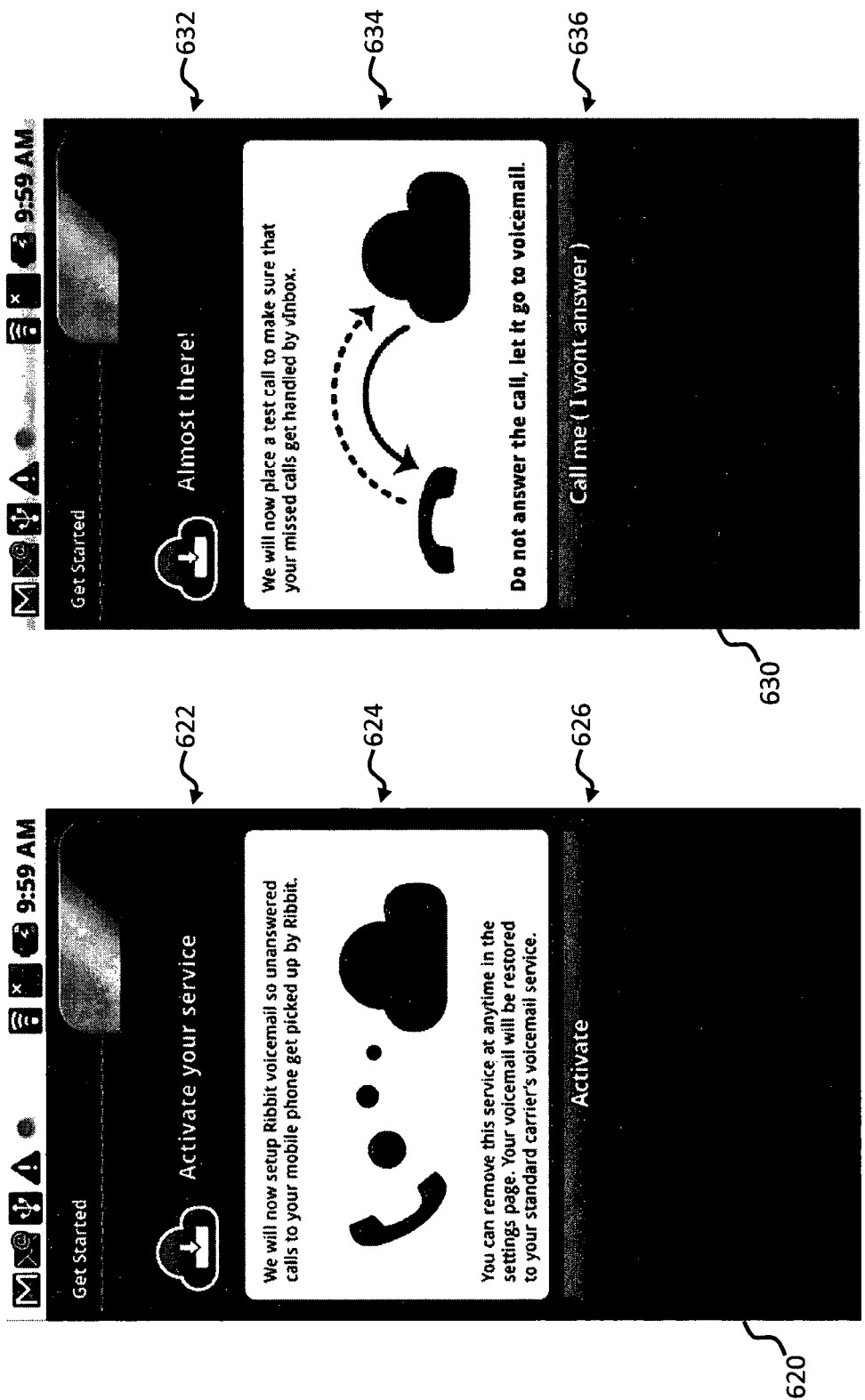

VOICEMAIL SYSTEM

This application is the U.S. national phase of International Application No. PCT/GB2013/000283, filed 25 Jun. 2013, which designated the U.S. and claims priority to EP Application No. 12250129.9, filed 29 Jun. 2012, the entire contents of each of which are hereby incorporated by reference.

The present invention relates to telecommunications in general and more specifically to an enhanced voicemail system.

Voicemail is generally regarded as an application or service whereby a first telecommunications service subscriber (the calling party) initiates a call to a second telecommunications service subscriber (the called party) and, upon failing to be connected directly with the called party, the unanswered incoming call to the called party is redirected to a messaging service where information intended for the called party may be provided by the calling party and stored (e.g. in the form of a voicemail message) by the provider of the messaging service for the called party to access at a later date or time.

The connection to the voicemail system terminates when the calling party has finished leaving the voicemail message or earlier if the calling party does not leave a message. Apart from the opportunity to leave a message, the calling party has very limited interaction with the conventional voicemail system.

BRIEF SUMMARY OF EMBODIMENTS

The invention addresses shortcomings in conventional voicemail systems by way of an enhanced voicemail system providing to the calling party access to a registration process for registering the calling party to receive a voicemail service from the voicemail system. According to a first aspect, the invention provides a voicemail system comprising: a first interface associated with a first network location for receiving an incoming call from a calling party. The voicemail system also comprises a processor configured to provide to the calling party a notification of a second network location and a second interface associated with the second network location and configured to provide to the calling party through the second network location, access to a registration process for registering the calling party to receive a voicemail service from the voicemail system.

A method of operating a voicemail system is also provided, comprising: receiving at the voicemail system at a first network location an incoming call from a calling party; providing to the calling party a notification of a second network location and providing to the calling party through the second network location, access to a registration process for registering the calling party to receive a voicemail service from the voicemail system.

Optionally, the first network location is a location in a first network and the second network location is a location in a second network. Optionally, the second network location is a location in a data network; the first network location is a location in a telephone communications network.

Other, optional aspects of the invention are set out in the appended claims.

BRIEF DESCRIPTION OF THE DRAWINGS

In order to aid understanding, embodiments of the invention will now be described by way of example with reference to the drawings in which:

FIGS. 1 to 3 show in block diagram form, a system according to aspects of the present invention.

DETAILED DESCRIPTION OF EMBODIMENTS

Figure 3:
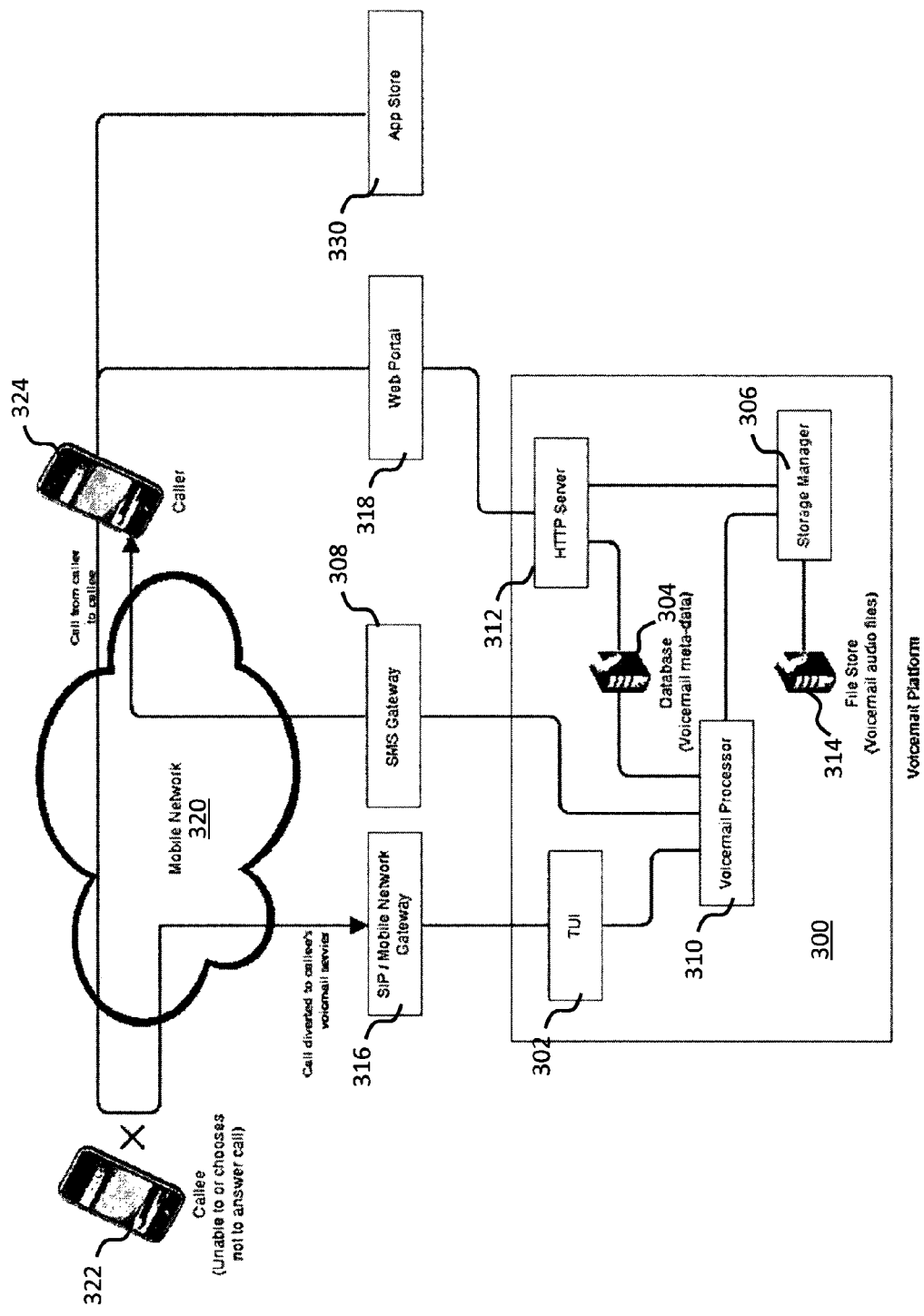

The enhanced voicemail system operates according to a method in which the voicemail system receives a call from a calling party. Typically, the received call will have been originally directed from the calling party's phone to a called party's phone and then redirected (e.g. on no answer by the called party) to connect the calling party to the voicemail system. The voicemail system provides to the calling party, as part of the call, a notification of a network location; and provides through the network location to the calling party, access to a registration process for registering the calling party to receive a voicemail service from the voicemail system.

The enhanced voicemail system, as described in detail below, creates value for the calling party in that they are now able to simply obtain access to a registration process for obtaining a voicemail service from the voicemail service provider. The enhanced voicemail service also creates value for the voicemail service provider in providing a new channel for registering new users to receive voicemail service.

According to various embodiments, the incoming call is a call from a calling party directed to a called party and redirected to connect the calling party to the voicemail system at the first network location; notification of a second network location comprises an indicator from which an internet protocol address of the second network location is derivable; the notification is provided to the calling party as part of the call; the second network location is dedicated to the calling party; and the notification is provided to the calling party outside of the incoming call. According to various further embodiments, the notification is provided to the calling party using information, derived as part of the call; the notification is provided in response to a request received in the course of the call; and the first and second interfaces are comprised in a voicemail server. According to various further embodiments, access to the registration process is provided in response to a request received from the calling party directed to the second network location; the calling party is authenticated by recording, in the course of the incoming call received at the first network location, a received indication of the source of the incoming call and verifying the received indication against the telephone number of the calling party obtained via the second network location. According to various further embodiments, the incoming call received at the first network location is terminated prior to providing to the calling party through the second network location, access to the registration process; and the notification of the second network location is directed to the calling party at a first device and the access to a registration process is provided to the calling party at a second device.

FIG. 1 depicts a voicemail communications system 100 according to one embodiment of the present invention. The voicemail communications system of FIG. 1 may form part of a public telecommunications network. A conventional public telecommunications network comprises a relatively small number of interconnected main switches forming a core or central network and a larger number of local switches forming part of several local networks. Each local switch is connected to one or more main switches and is connected along local access lines of a local communication network to several items of subscriber equipment such as telephone instruments provided for users of the network.

As shown in FIG. 1, voicemail communications system 100 comprises calling party communication terminal device 10, local communication network 30, central communications network 60, local communication network 40, called party communication terminal device 20 and voicemail system 70. It will be recognized that alternative embodiments of the present invention may embody variations in system 100, for example calling party communication terminal device 10, called party communication terminal device 20 and voicemail system 70 may all be connected directly to local communication network 30.

Communication terminal devices 10, 20 include any voice communication devices, such as fixed, landline telephones, cellular telephones, other telephones, including soft phones, communicating via internet protocol (IP) or any other device capable of providing voice communications over any form of telephone network.

Local communication networks 30, 40 may comprise any communication system capable of routing voice communications between communication terminal device 10 and communication terminal device 20. For example, local communication networks 30, 40 may comprise private branch exchanges, concentrators and local switching centres with one or more telephone switches.

Central communications network 60 may comprise any communications network suitable for conveying voice traffic at suitably high volumes in any form, including Ethernet, MPLS, SDH, ATM and IP networks.

Voicemail system 70 provides for storage of voicemail messages for a called party associated with communication terminal device 20. Typically, voicemail system 70 also provides for storage of voicemail messages for a plurality of further users associated with additional communication terminal devices (not shown). Voicemail system 70 may be a physical answering machine providing storage in physical media, such as tape or disc or semiconductor memory. Voicemail system 70 may be a service provided, e.g., by the provider of communications services to the called party on terminal 20 and to other users. Voicemail system 70 may be embodied in a network server (not shown) located in local communication network 40, central communications network 60 or elsewhere. The network server may store messages in local semiconductor memory or local or remote disc storage. The machine or service may store voicemail messages for a specific called party and only provide read access to these messages to the called party accessing the voicemail system from their own telephone or upon presentation of appropriate credentials. The called party may access the voicemail system to access messages, alter configuration settings, etc.

As used here, a voicemail message is any message comprising an audio element that is recorded for a user by voicemail system 70, whether in analog or digital form. For example, the message may comprise audio with or without associated pictorial elements, such as video.

Calling party communication terminal device 10 is configured to initiate a communication (referred to as a call) to called party communication terminal device 20 via networks 30, 40, 60. A call may be any communication from communication terminal device 10 to communication terminal device 20. When a called party does not answer a call, then the call is directed to voicemail system 70. For example, the call may go from calling party communication terminal device 10 to local communication network 30; local communication network 30 then routes the communication through central communications network 60 to local communication network 40; local communication network 40 determines that the communication is for the called party and routes the communication to called party communication terminal device 20. When the called party does not answer the call, it is redirected or re-routed to voicemail system 70. For example, the call may be re-routed across local network 40 to voicemail system 70.

Voicemail system 70 may present the calling party with a greeting and instructions on how to leave a voicemail message. For example, a calling party may select an option to leave a voicemail message. In one embodiment, an indication is sent from voicemail system 70 to communication terminal device 10 indicating that the calling party should leave a voicemail message after a signal from voicemail system 70. In an alternative embodiment, the calling party is asked to provide signals in order to direct operation of voicemail system 70 in recording a voicemail message. Suitable signals may be generated using a keypad on communication terminal device 10. For example, the calling party may press the * key to start recording and the # key to end recording. Alternatively, a calling party may end recording by terminating the connection (hanging up). Once voicemail system 70 is in recording mode, any audio sent by the calling party via communication terminal device 10 is recorded by voicemail system 70 as a voicemail message. The voicemail message left by the calling party may then be accessed by the called party at a later time convenient to the called party.

A typical architecture for a server or other form of computer apparatus on which software implementing the invention can be run, is shown by way of example in FIG. 2. The architecture of each server or other form of computer apparatus of the voicemail system comprises a central processing unit (CPU) 110 for executing computer apparatus programs and managing and controlling the operation of the computer apparatus. The CPU 110 is connected to via a bus 111 to a variety of devices including solid-state memory devices including non-volatile ROM 114, volatile RAM 115 and non-volatile data storage means. The non-volatile data storage means may comprise one or more hard disc drives 120; in addition there may be provided removable non-volatile data storage means (not shown), such as removable hard disc drives or optical media (for example re-writable or recordable DVDs).

The architecture further comprises one or more network interface 116 (one shown) for interfacing to and exchanging data via one or more networks (not shown) such as a mobile or landline telephony network or an IP network underpinning the various connections shown in FIGS. 1 and 3. The network interfaces) may be a telephone network interface, local area network (LAN) adaptor connecting to a LAN or other network interface of conventional design familiar to persons of skill in the art. The LAN may itself be connected to other LANs and wide area networks (WANs) to enable the apparatus to communicate with and exchange data with other computer apparatuses. Alternatively, the network interface may be a DSL modem, or similar, that provides a connection to a WAN, such as the internet or an intranet, which enables communications with further networks.

The architecture also, optionally, includes user input/output devices such as a pointer device 117 and keyboard 118 connected to the bus 111 via input/output port 119, as well as a display 112. The computer apparatus is powered by power supply unit 130, typically obtaining power from an external power grid or internal battery (not shown). The skilled person will understand that this architecture is not limiting, but is merely an example of typical computer apparatus architectures which may be used to implement a modern communication terminal device or a server. The computer apparatus may also be a distributed system, comprising a number of computer apparatuses communicating through respective interface ports 116.

Non-volatile data storage means 120 comprises an operating system 122 and may comprise one or more application programs 124. Operating system 122 comprises the software that the computing apparatus requires to operate, communicate with other computer apparatuses, receive input from users, display outputs and results to users, etc. Application programs 124 can be executed by the apparatus in order to additional functionality. Non-volatile data storage means 120 further comprises computer apparatus code 126 which can be executed in order to perform various elements of a method according to the present invention, for example such as the one described below and illustrated in the drawings. It will be understood that computer apparatus code 126 may comprise a single integrated application or a number of different modules that are accessed separately to execute a method according to the present invention. Each module may perform the functionality of one or more of the processes (for example detecting an input or generating a message), which comprise components of present invention.

FIG. 3 shows a voicemail system of the invention in more detail.

According to the invention, the voicemail system provides an enhanced service to calling parties. Voicemail platform 300 comprises voicemail processor 310 (e.g. complying with the computer architecture of FIG. 2), arranged in communication with other components of voicemail platform 300, as follows: telephone user interface (TUI) 302, voicemail metadata database 304 and storage manager 306. TUI 302 provides access from called party's terminal device 322 to called party's voicemail box. Voicemail metadata database 304 provides storage for information relating to voicemail messages stored in file store 314. For example, voicemail metadata database 304 stores time of receipt, length and read status for each voicemail message left for the called party.

Storage manager 306 is arranged in communication with file store 314 for storing and retrieving voicemail audio files. The voicemail audio files left for the called party stored in file store 314 represent the contents of the called party's voicemail box. Voicemail platform 300 further comprises a HTTP server (e.g. HTTP Rest server 312), which is arranged in communication with other components of voicemail platform 300, as follows: voicemail metadata database 304 and storage manager 306. A number of connections are arranged external to voicemail platform 300. voicemail processor 310 is arranged in communication with short message service (SMS) gateway 308. TUI 302 is arranged in communication with SIP/mobile network gateway 316. HTTP server 312 is arranged in communication with web portal 318. SMS gateway 308 is arranged in communication with mobile network 320 and, via the mobile network is communicable with a number of telephone terminal devices, including calling party terminal device 324 for exchange of SMS messages. SIP/mobile. network gateway 316 is arranged in communication with mobile network 320 and, via the mobile network is communicable with a number of telephone terminal devices, including called party terminal device 322 for receipt of mobile telephone calls. According to a further aspect of the invention, SIP/mobile network gateway 316 is arranged to receive SIP telephone calls via a data network, such as an IP network (not shown) from calling party terminal device 324. Web portal 318 is arranged in communication with calling party terminal device 324 via a data network (not shown). For example web portal 318 may connect to calling party terminal device 324 via a mobile phone data network. According to a further aspect of the invention, the calling party may connect with web portal 318 using a network-connected device (not shown) different to calling party terminal device 324. Application store 330 is arranged in communication with calling party terminal device 324 via a data network (not shown).

Calling parties whose call is redirected to the voicemail system are presented with a prompt or other notification that the enhanced service providing access to a registration facility network location is available. For example, a voice message may be played to the calling party on reaching the voicemail system similar to: "if you would like to register with this voicemail service, please press *2 and you will receive an SMS text with a link to our registration website". In an alternative embodiment, the prompt may notify the user by a different mechanism. For example, the calling party on reaching the voicemail system may be instructed to enter a code (e.g. DTMF) sequence to initiate sending of an email to the calling party, where the email contains a link indicating the network location providing access to a registration facility.

Figure 4C:
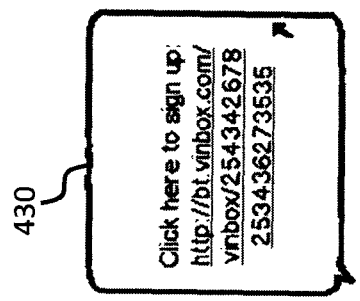
FIGS. 4 to 6 show schematic representations of typical screen displays generated according to the invention.
Figure 4B:
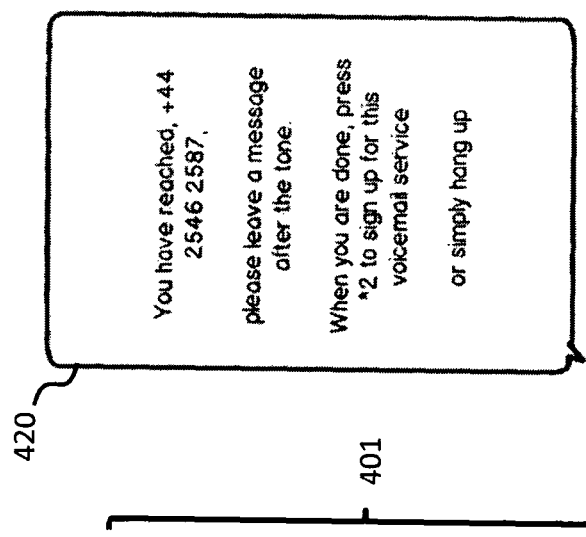
Figure 4A:
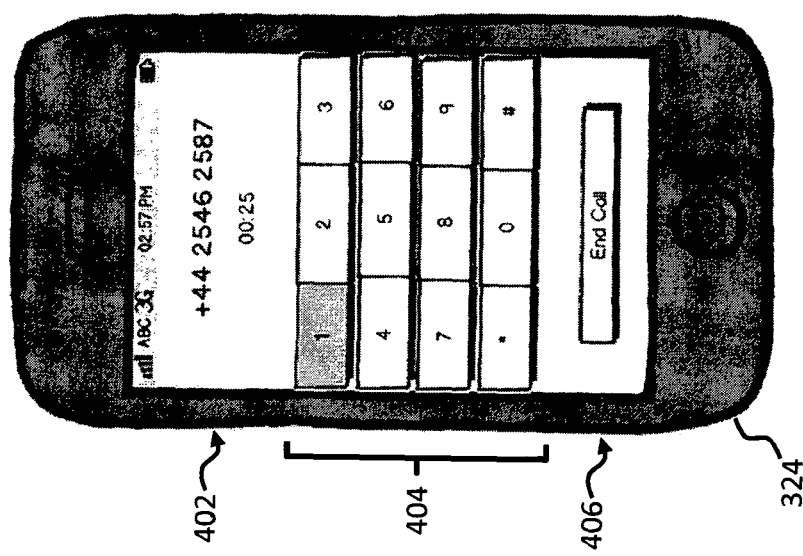

FIG. 4a shows calling party's mobile device 324 with display screen 401 showing typical content that may be shown during an outgoing call. Display screen 401, typically displays destination telephone number 402, keyboard 404 and "end call" button 406. FIG. 4b shows a separate representation 420 of a typical content which may be communicated via a loudspeaker (not shown) on calling party's communication terminal device 324 or appear on display screen 401 including content which may be provided by the voicemail system during an outgoing call redirected to the voicemail system, including instructions received as a voice message from the voicemail system. The instructions may be received during a call made from calling party's mobile device 324 to called party's mobile device 322, where the call has been redirected to the voicemail system. Instructions comprised in content 420 relate to recording a voice message with the voicemail system: "you have reached +44 2546 2587, please leave a message after the tone"; where "+44 2546 2587" is the number of calling party's mobile device 322. In addition, according to the invention, instructions are provided relating to accessing a registration process: "When, you are done, press *2 to get a link to our registration website", or similar. The calling party may, optionally, leave a message on the called party's voicemail box during the call.

The calling party enters a key sequence (e.g. *2) to request access to the voicemail system registration facility. The calling party may then receive confirmation that the voicemail system has accepted the calling party's request. For example, the voicemail system may play to the calling party a voice message similar to "thank you, a link to our registration facility will be texted to 0123 45678", where "0123 45678" is the telephone number of calling party's mobile device 324. In an alternative embodiment, the system may confirm "thank you, a link to our registration facility will be emailed to name@btinternet.com", where "name@btinternet.com" is an email address associated with the calling party. The call is then terminated.

In response to a request from the user for access to the registration process, the voicemail system may contact the user, e.g. by an SMS or an email message, outside of the call, for example once the call has been terminated. The SMS or email message may indicate by means of a hyperlink, a web address or other network resource indicator, a network location, such as a webpage, through which the calling party may register with the voicemail system. For example, a web portal may be operated by the voicemail system or independently operated but provides access to the voicemail system registration process. Successful registration results in the voicemail system providing to the calling party a voicemail service. As part of the voicemail service, the calling party can access their own account and mailbox with the voicemail system.

FIG. 4c shows display screen 401 of calling party's mobile device 400 showing text content 430 of an SMS message received from the called party's voicemail system in response to the user entering the code (e.g. *2) for initiating a registration process. The SMS message provides to the calling party a URI of a website at which a voicemail registration facility may be accessed e.g. "http://bt.vinbox.com/vinbox/254342678253436273535". Alternatively, the called party's voicemail system may provide the URI in a message (not shown) to an email address provided by the user. The user could then, for example, access the email from a suitable client running on calling party's mobile device or from a separate, networked computer.

In order to contact the user outside of the call, the voicemail system needs to acquire an address of the calling party. According to one aspect of the invention, the voicemail system monitors incoming calls and detects a network location associated with the calling party's communication terminal device. The calling party's network location may be divined from a CLI (or calling line identity) associated with the calling party's telephone connection. The network location can then be used to direct an SMS message to the calling party at the terminal used to access the voicemail system. According to another aspect of the invention, the voicemail system uses voice prompts to prompt the user for an email address in the course of the redirected call. During the redirected call, the user can then speak an email address which the voicemail system converts to text by using conventional techniques, and captures the user's email address.

Registration Via Telephone

According to a further aspect of the invention, instead of a URI, the network location may be indicated by means of a telephone number that the calling party can call to listen to audio prompts relating to a registration process. The calling party can take part in the registration process by responding to the audio prompts. For example, the calling party can enter information in response to the prompts by speaking or using the terminal keypad to generate DTMF tones. This aspect may be preferred where the user does not have access to a data network.

Registration Via Webpage.

When the calling party activates a hyperlink or uses a URI or network address to access a network location, a webpage providing access to a registration facility is displayed. For example, the webpage will be displayed in a browser on a calling party-operated networked device such as a smart phone, tablet or personal computer (not shown) with network access. That is, the network access may comprise access via a data network connection running over the calling party's telephone network or otherwise. The webpage may present the calling party with a number of options.

For example, the calling party may be offered the option to request their own voicemail box to be provisioned by the provider of the called party's voicemail service.

Figure 5:
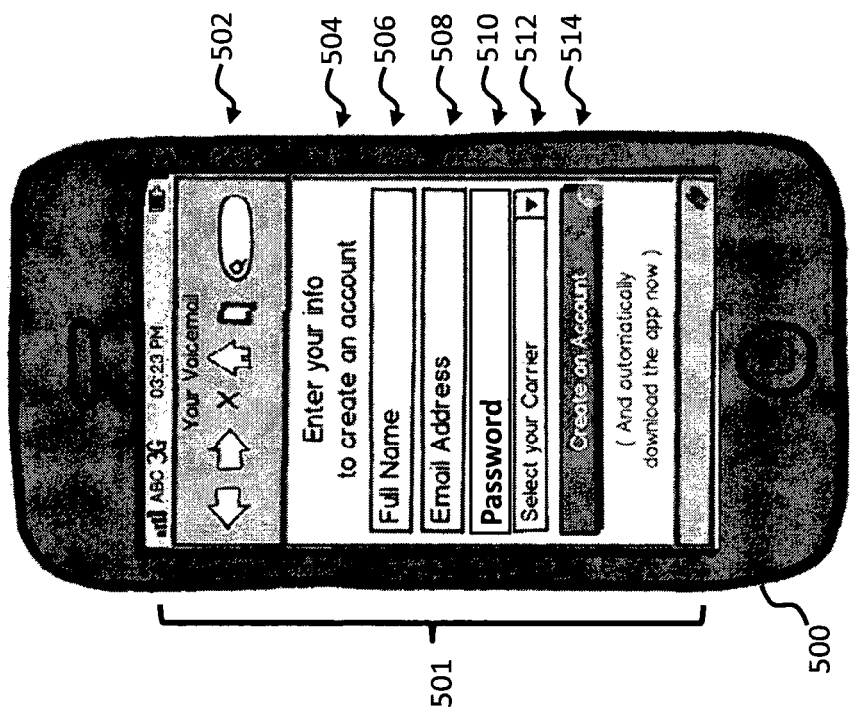

FIG. 5 shows an example of a sample welcome screen webpage 501 provided at the network location for the registration process and displayed in a browser running on a mobile phone 500, according to an aspect of the invention. Welcome screen webpage 501 may comprise browser control panel 502 for controlling viewing of different web pages. The calling party may be asked to provide credentials to enable secure access. Webpage 501 comprises prompt text 504, prompting the calling party to enter credentials. These credentials may comprise the user's name and an email address or other personal identification or authentication information. For example, webpage 501 comprises data entry fields 506, 508, 510 for entering the user's name, an email address and the user's password, respectively. Once the user has entered the requested credentials, they may select "Create Account" button 514 to initiate an account creation process for the calling party. Optionally, the calling party may be asked to confirm the identity of their mobile service provider by selecting from a dropdown list in window 512. Use of webpage 501 has the advantage of allowing a calling party to create an account without needing to download an application to their terminal device.

According to a further aspect of the invention, following successful completion of the data entry fields 506, 508, 510, the voicemail system sends to the calling party a link via SMS that will allow calling party to download a voicemail application. The calling party will need to sign-in via the application with their new credentials and then setup call forwarding on their phone thereby completing the sign-up and setup-user journey. Sign-in authenticates the user of the account, enabling the user to retrieve stored messages and to modify personal settings. The calling party may set up call forwarding on their phone using conventional functionality offered by the provider of the network (e.g. local network 30) to which the calling party's phone is connected.

FIGS. 6a-6e show examples of suitable screens displayed by an application downloaded to and running on the user's communications terminal device (in this example mobile phone 500), according to a further aspect of the invention. The application is downloaded and installed to user's mobile, phone 500 following correct completion of data entry fields 506, 508, 510 on webpage 501. Use of the application facilitates completion of the registration process. Screens 600, 620, 630, 640, and 650 each comprise a number of fields for either or both (i) displaying information to the calling party and (ii) accepting commands in the form of selections (e.g. mouse clicks) or entered text from the calling party. Once the calling party has accessed the network location, they can then begin the process of registering for a new account.

Figure 6A:
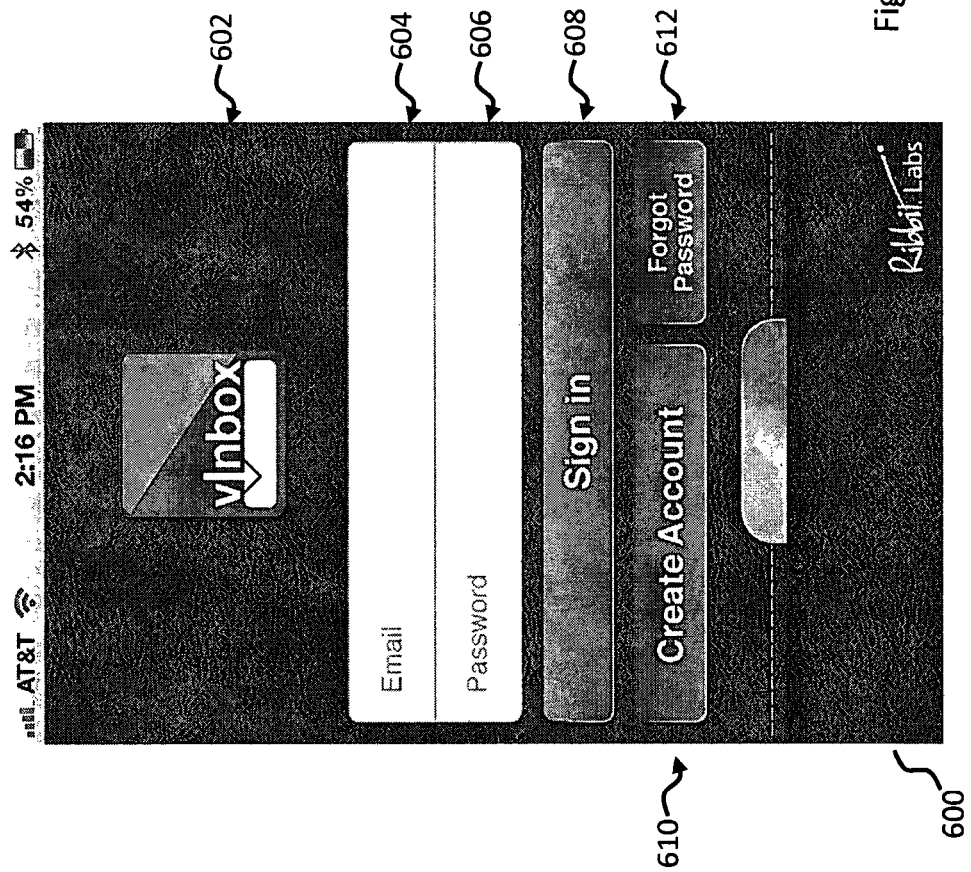

FIG. 6a shows screen 600 displayed by the application following downloading and installation to user's mobile phone 500. Screen 600 comprises header field 602. For example, header field 602 may display the name and logo of the voicemail service. The calling party may be asked to provide credentials to enable secure access for the calling party. These credentials may comprise an email address, a password or other personal identification or authentication information. Screen 600 comprises data entry fields 604, 606 for example, prompting the calling party to enter their email address and to enter a password, respectively, such as the password entered in field 510 on webpage 501. The calling party may select "Create Account" button 610 to continue the registration process for the calling party. Existing subscribers may be catered for by providing the opportunity to sign in or request a password reminder. An existing subscriber may select "Sign In" button 608 or "Forgot Password" button 612.

FIG. 6b shows screen 620 displayed by the application following correct completion of the data entry fields 604-606 and activation of "create account" field 610 on screen 600. Screen 620 comprise fields 622-626. Header field 622 may act to remind the calling party where they are in the process of registration, for example, header field 622 may display a message "activate your service". Information field 624 confirms to the calling party that a voicemail account is about to be set up for the calling party. The calling party may select "activate" field 626 to initiate activation of an account.

FIG. 6c shows screen 630 displayed in response to activation of "activate" field 626 on screen 620. Screen 630 comprises fields 632-636. Header field 632 may act to remind the calling party where they are in the registration process. Information field 634 informs the calling party that a test call is about to be made to the telephone number associated with the calling party's voicemail box, so as to ensure unanswered calls will be redirected correctly to the calling party's voicemail box. The calling party may select "call me (I won't answer)" field 636 to initiate making the test call.

Figures 6D, 6E:

FIG. 6d shows screen 640 automatically displayed in response to the test call being successfully handled by the voicemail system. Screen 640 comprises fields 642-646. Header field 642 may act to remind the calling party where they are in the registration process, for example, header field 642 may display a message "Congratulations!" Information field 644 notifies the calling party that the calling party's voicemail box is now set up and operational. The calling party may select "Done" field 646 to acknowledge receipt of the notification in field 644.

FIG. 6e shows screen 650 displayed in response to activation of "Done" field 646 on screen 640. Screen 650 comprises fields 652-656. Header field 652 may act to remind the calling party where they are in the registration process. Information field 654 notifies the calling party of a PIN for use when accessing the calling party's voicemail box. The PIN provides for secure access to the calling party's voicemail box and account settings. Information field 654 may provide further guidance to a newly registered user of the voicemail service. The calling party may select "Thanks" field 656 to acknowledge receipt of the PIN and to terminate the registration process.

Figure 7A:
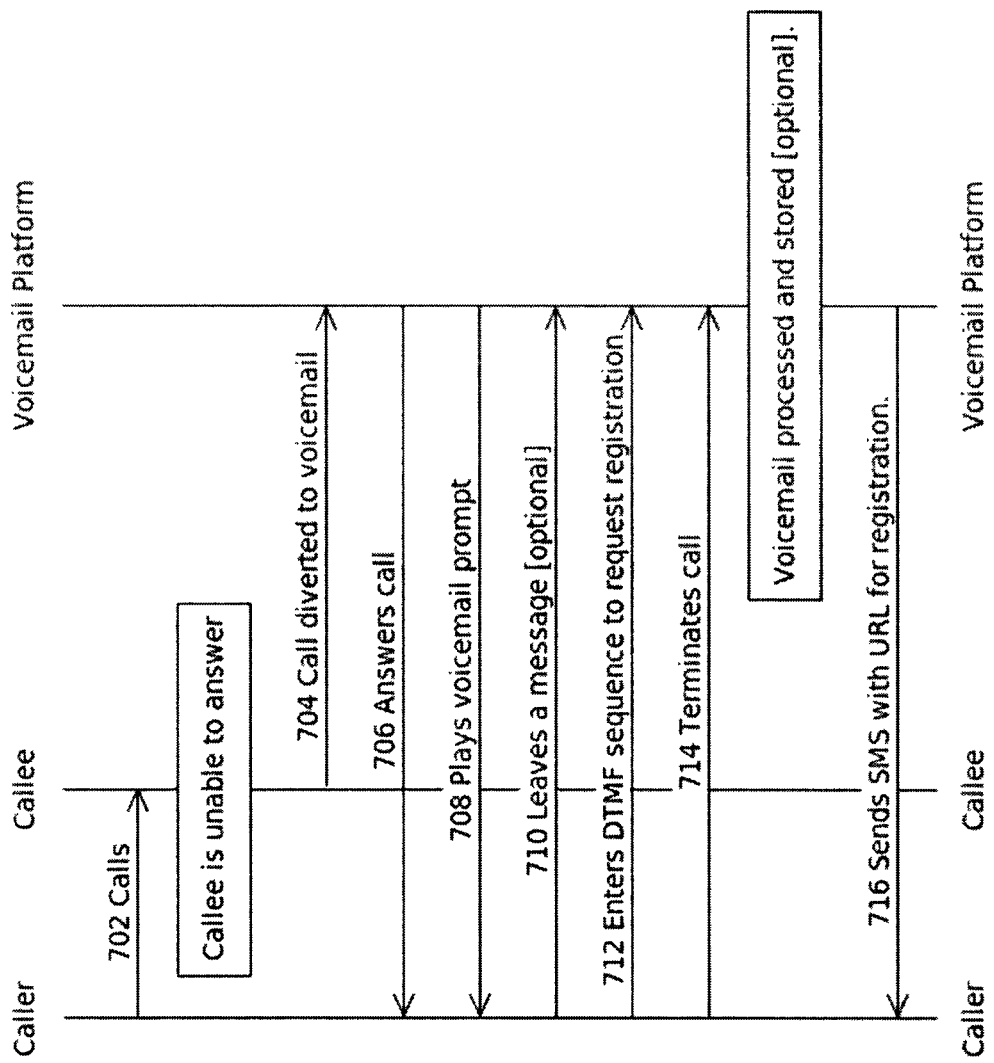
FIG. 7 shows a representation of signal flows according to an aspect of the invention.
Figure 7B:
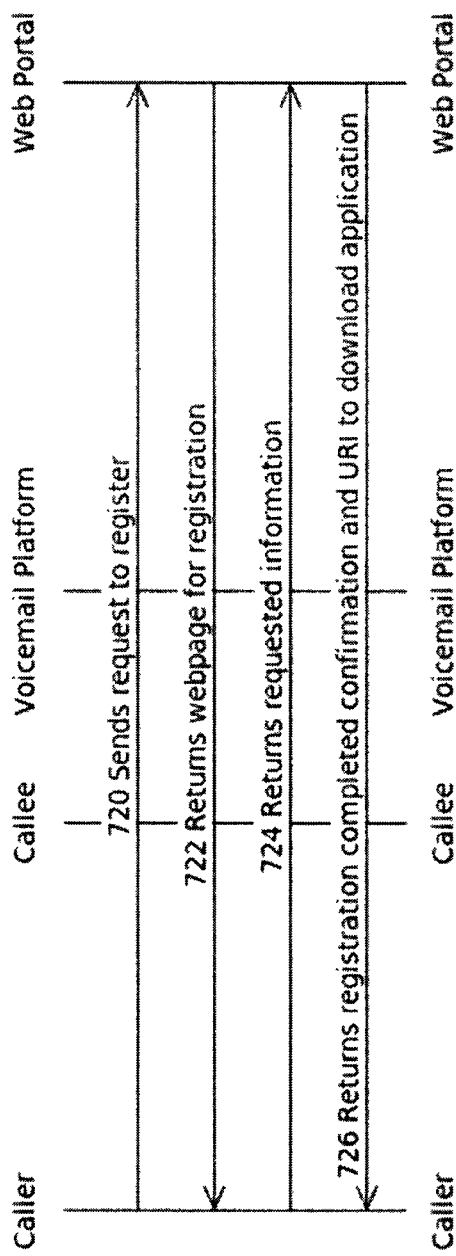
Figure 7C:
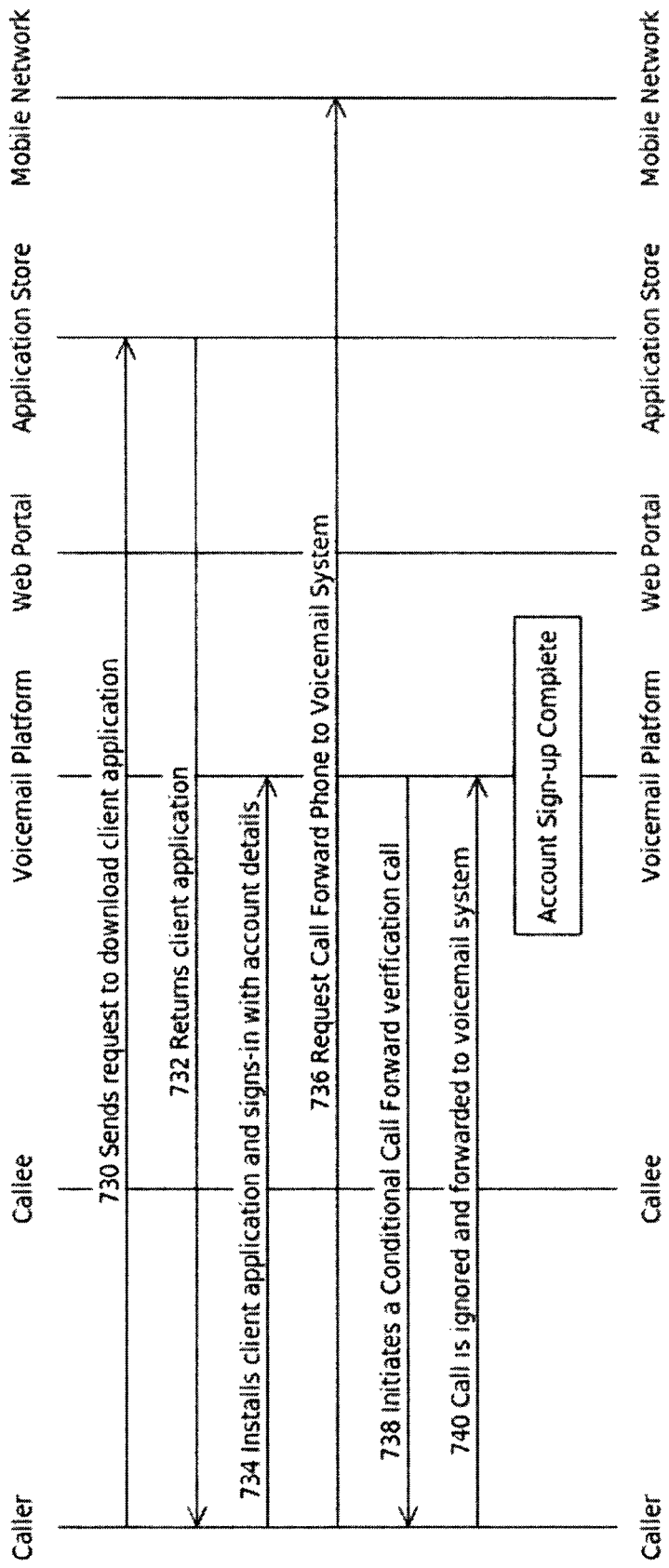

FIGS. 7a, to 7c show typical message flows relating to operation of the voicemail system of FIG. 3. In these Figures, interactions are shown between various combinations of: caller (i.e. calling party terminal: device 324), callee (i.e. called party terminal device 322), voicemail platform 300, web portal 318, application store 330 and mobile network 320. FIG. 7a shows interactions related to the act of (optionally) recording a voicemail message and requesting registration. At 702, calling party initiates a telephone call to called party. The called party is unable to answer the call or decides not to answer and at 704, the call is redirected to voicemail platform 300, which answers the call 706 and prompts 708 the calling party to use the called party's voicemail service, as described, above. At 710, calling party (optionally) leaves a message for called party and at 712, enters the correct DTMF sequence to notify voicemail platform 300 that the calling party wants to register. At 714, calling party terminates the call by hanging up. Where a voicemail message has been left by the calling party, it is processed by voicemail processor 310 and passed to storage manager 306 for storing in file store 314. At 716, voicemail platform 300 sends a URI to the called party, e.g. by SMS message.

FIG. 7b shows interactions related to the calling party registering with the voicemail system. At 720, calling party uses the URI supplied to send a request to register to web portal 318. At 722 web portal 318 sends to calling party terminal device 324, a webpage for registration of the Calling party. At 724, calling party returns to web portal 318 requested registration information and at 726 web portal 318 returns "registration completed" confirmation message and (optionally) a URI to download a voicemail application to calling party terminal device 324.

FIG. 7c shows interactions related to the downloading and operation of the voicemail application to calling party terminal device 324. At 730, calling party sends to application store 330 a request to download a voicemail client application. At 732, application store 330 returns the requested client application to calling party terminal device 324. At 734, the client application is installed at calling party terminal device 324 and calling party operates the client application to sign-in with account details to voicemail platform 300. At 736, calling party sets up call forwarding on no reply for calls to calling party terminal device 324 by sending a "Conditional Call Forward Phone" request to mobile network 320. Voicemail platform 300 then initiates at 738 a test call to calling party terminal device 324, in order to verify that call forwarding is working as desired. Calling party ignores the test call, which is forwarded, at 740, to voicemail platform 300. This completes user registration and account set-up.

The called party may choose to enable the enhanced operation of the voicemail system, described above, for example through the TUI 302 or similar control mechanism. Alternatively, the called party may choose to enable this feature through a configuration website (not shown) operated by the provider of the voicemail service and hosted by HTTP rest server 312. For example, the called party may be able to manage their account, including selecting the enhanced operation, by logging on to a configuration website using secure credentials, such as an oAuth token or password/username combination. Further aspects of the invention provide alternative modes of authenticating the called party. According to an alternative embodiment, enhanced operation may be enabled on the part of the voicemail service.

The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of another of the embodiments, or any combination of the embodiments. Furthermore, equivalents and modifications not described above will be evident to the skilled reader and may also be employed without departing from the scope of the invention, which is defined in the accompanying claims.

As will be understood by those skilled in the art, the invention may be implemented in computer program product software, any or all of which may be contained on various storage media so that the program can be loaded onto one or more general purpose computers or downloaded over a computer network using a suitable transmission medium. The computer program product used to implement the invention may be embodied on any suitable carrier, readable by a suitable computer input device, such computer program product comprising optically readable media, magnetic media, punched card or tape. The invention may be implemented by one or more hardware server system having one or more processors and memory storing one or more programs that when executed by the one or more processors cause the server system to perform the invention.

The invention claimed is:
1. A method of operating a voicemail system, comprising:
receiving at the voicemail system an incoming call from a calling party;
in which the incoming call is received at the voicemail system at a first network location;
in which the incoming call is a call from the calling party directed to a called party and redirected to connect the calling party to the voicemail system at the first network location;
in which the method further comprises:
the voicemail system providing to the calling party a notification of a second network location;
the voicemail system providing to the calling party through the second network location, access to a registration process for registering the calling party to receive a voicemail service from the voicemail system; and
authenticating the calling party by recording, in the course of the incoming call received at the first network location, a received indication of the source of the incoming call; obtaining via the second network location a telephone number of the calling party; and verifying the telephone number against the received indication.

2. The method of claim 1 in which the first network location is a location in a first network and the second network location is a location in a second network.

3. The method of claim 1 in which the second network location is a location in a data network.

4. The method of claim 1 in which the first network location is a location in a telephone communications network.

5. The method of claim 1 in which the notification is provided in response to a request received in the course of the call.

6. The method of claim 1 in which the first network location is associated with a voicemail service of the called party.

7. The method of claim 1 in which the notification is provided to the calling party outside of the incoming call.

8. The method of claim 1 in which the voicemail system provides to the calling party an opportunity to record an audio message from the calling party for the called party as part of the incoming call.

9. A voicemail system comprising:
a first interface associated with a first network location for receiving an incoming call from a calling party;
in which the incoming call is a call from the calling party directed to a called party and redirected to connect the calling party to the voicemail system at the first network location;
a processor configured to provide to the calling party a notification of a second network location;
a second interface associated with the second network location and configured to provide to the calling party through the second network location, access to a registration process for registering the calling party to receive a voicemail service from the voicemail system; and
wherein the processor is further configured to authenticate the calling party by recording, in the course of the incoming call received at the first network location, a received indication of the source of the incoming call; obtain via the second network location a telephone number of the calling party; and verify the telephone number against the received indication.

10. The system as claimed in claim 9 in which the first network location is a location in a first network and the second network location is a location in a second network.

11. The system as claimed in claim 9 in which the second network location is a location in a data network.

12. The system as claimed in claim 9 in which the first network location is a location in a telephone communications network.

13. The system as claimed in claim 9 in which access to the registration process is provided in response to a request received from the calling party directed to the second network location.

14. The system as claimed in claim 9 in which the notification is provided to the calling party using information, derived as part of the call, indicating a network address of the calling party.

15. The system as claimed in claim 9 in which the notification is provided in response to a request received in the course of the call.

16. The system as claimed in claim 9 in which the first network location is associated with a voicemail service of the called party.

* * * * *